US008521573B2

(12) United States Patent
Tanaka et al.

(10) Patent No.: US 8,521,573 B2
(45) Date of Patent: Aug. 27, 2013

(54) SYSTEM AND METHOD FOR SUPPORTING SELECTION OF SUBJECT FOR RESTRICTION COUNTERMEASURE

(75) Inventors: Masataka Tanaka, Yokohama (JP);
Noriyasu Ninagawa, Kamakura (JP);
Yasuhiro Hamatsuka, Yokohama (JP);
Yuzo Hiroshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 13/057,822

(22) PCT Filed: Jun. 2, 2009

(86) PCT No.: PCT/JP2009/060054
§ 371 (c)(1),
(2), (4) Date: Apr. 20, 2011

(87) PCT Pub. No.: WO2010/035550
PCT Pub. Date: Apr. 1, 2010

(65) Prior Publication Data
US 2011/0191130 A1    Aug. 4, 2011

(30) Foreign Application Priority Data

Sep. 26, 2008    (JP) .................................. 2008-247082

(51) Int. Cl.
*G06F 17/00*    (2006.01)

(52) U.S. Cl.
USPC ........................................................ 705/7.11

(58) Field of Classification Search
None
See application file for complete search history.

(56) References Cited

U.S. PATENT DOCUMENTS

2005/0071259 A1    3/2005    Arai et al.
2007/0043635 A1    2/2007    Hotta et al.

(Continued)

FOREIGN PATENT DOCUMENTS

JP    2003-256504    9/2003
JP    2005-71338    3/2005

(Continued)

OTHER PUBLICATIONS

Japanese Office Action for Japanese Patent Application No. 2008-247082, issued on Jul. 10, 2012.

(Continued)

*Primary Examiner* — Thomas Dixon
(74) *Attorney, Agent, or Firm* — Antonelli, Terry, Stout & Kraus, LLP.

(57) ABSTRACT

Disclosed is a method for supporting the selection of a component or chemical substance for countermeasure in compliance with a restriction or the like to limit a content rate or content amount of a chemical substance of a product coming in or going out from each enterprise. The method accepts the products to inspect a situation in compliance with the restriction and an evaluation subject restriction that are inputted by a user; acquires a threshold value of the chemical substance content rate for every subject substance under the restriction, composing components of the subject product, weight and a category of the components, and chemical substance content rates of the components; extracts components with no information on the chemical substance content rates out of the components; searches similar components with the same categories as those of the extracted components; acquires chemical substance content rates of the similar components; allocates statistic values, such as the maximum value or average value of the chemical substance content rates of the similar components to chemical substance content rates of the extracted components; calculates a chemical substance content rate of the product from the information on the composing components of the product, the weight of the components and the chemical substance content rates of the components or similar components; compares the chemical substance content rate of the extracted product with the threshold value; categorizes the chemical substances into the one that exceeds the threshold value and the other that does not exceed the threshold value as a comparison result; stores the categorized data at the memory device; and displays the comparison result on a display device.

8 Claims, 16 Drawing Sheets

(56) References Cited

U.S. PATENT DOCUMENTS

2007/0061310 A1 3/2007 Ninagawa et al.
2008/0040390 A1* 2/2008 Oves et al. .................. 707/104.1

FOREIGN PATENT DOCUMENTS

| JP | 2005-309674 | 11/2005 |
|---|---|---|
| JP | 2006-277426 | 10/2006 |
| JP | 2007-26127 | 2/2007 |
| JP | 2007-79705 | 3/2007 |

OTHER PUBLICATIONS

Hiroshi Ogata, "Sekkei Tool to Rendo Shita Seihin Gan'yu Kagaku Busshitsu Kanri System no Kochiku", Oki Technical Review, Jul. 1, 2004, pp. 36-37, vol. 71, No. 3.

Tsunenori Tomioka, "Yugai Kagaku Busshitsu no Kisei Kyoka ni Shoju", Nikkei Digital Engineering, Feb. 15, 2004, pp. 30-31, vol. 75.

* cited by examiner

FIG.3

PRODUCT COMPOSING COMPONENTS INFORMATION 111

| PRODUCT ID | PRODUCT NAME | COMPONENTS ID | COMPONENTS NAME | NUMBER |
|---|---|---|---|---|
| 100 | A-01 | p011 | a-01 | 5 |
| 100 | A-01 | p021 | b-01 | 10 |
| 100 | A-01 | p031 | c-01 | 15 |
| 200 | B-01 | p041 | d-01 | 10 |
| ⋮ | | | | |

FIG.4

COMPONENTS INFORMATION 112

| COMPO-NENTS ID | COMPO-NENTS NAME | WEIGHT (g) | COMPONENTS CATEGORY ID | COMPONENTS CATEGORY NAME | CHEMICAL SUBSTANCE INFORMATION FLAG |
|---|---|---|---|---|---|
| p011 | a-01 | 100 | 10 | A | 1 |
| p021 | b-01 | 80 | 20 | B | 1 |
| p031 | c-01 | 200 | 30 | C | 0 |
| p032 | c-02 | 200 | 30 | C | 1 |
| p033 | c-03 | 250 | 30 | C | 1 |
| p034 | c-04 | 150 | 30 | C | 1 |
| p041 | d-01 | 100 | 40 | D | 0 |
| ⋮ | | | | | |

FIG.5

COMPONENTS CHEMICAL SUBSTANCE INFORMATION 113

| COMPONENTS ID | COMPONENTS NAME | CHEMICAL SUBSTANCE ID | CONTENT RATE (%) |
|---|---|---|---|
| p011 | a-01 | CAS01 | 0.070 |
| p011 | a-01 | CAS03 | 0.040 |
| p021 | b-01 | CAS02 | 0.050 |
| p021 | b-01 | CAS03 | 0.030 |
| p032 | c-02 | CAS01 | 0.280 |
| p032 | c-02 | CAS02 | 0.001 |
| p032 | c-02 | CAS03 | 0.053 |
| p032 | c-02 | CAS04 | 0.220 |
| p033 | c-03 | CAS01 | 0.200 |
| p033 | c-03 | CAS02 | 0.072 |
| p033 | c-03 | CAS03 | 0.024 |
| p033 | c-03 | CAS04 | 0.072 |
| p034 | c-04 | CAS01 | 0.160 |
| p034 | c-04 | CAS02 | 0.043 |
| p034 | c-04 | CAS03 | 0.082 |
| p034 | c-04 | CAS04 | 0.110 |
| ⋮ | | | |

FIG.6

RESTRICTION THRESHOLD VALUE INFORMATION 114

| RESTRICTION ID | RESTRICTION NAME | RESTRICTION CONTENT | THRESHOLD VALUE | UNIT | CONDITION |
|---|---|---|---|---|---|
| E-RE01 | REACH | INFORMATION TRANSMISSION | 0.1 | % | EQUAL TO OR HIGHER |
| E-RE02 | REACH | REGISTER | 1 | t | EQUAL TO OR HIGHER |
| ... | ... | ... | ... | ... | ... |
| E-Ro01 | RoHS | CONTAINMENT FORBIDDEN (OTHER THAN Cd) | 1000 | ppm | EQUAL TO OR HIGHER |
| | | | | | |

FIG.7

JUDGMENT RESULT INFORMATION 115

| PRODUCT ID | PRODUCT NAME | CHEMICAL SUBSTANCE ID | RESTRICTION ID | THRESHOLD VALUE JUDGMENT RESULT FLAG |
|---|---|---|---|---|
| 100 | A-01 | CAS01 | E-RE01 | 1 |
| 100 | A-01 | CAS02 | E-RE01 | 0 |
| 100 | A-01 | CAS03 | E-RE01 | 0 |
| 100 | A-01 | CAS04 | E-RE01 | 1 |
| | | | | |

■ EVALUATION SUBJECT PRODUCT

A-01

☐ ALL PRODUCTS

■ EVALUATION SUBJECT RESTRICTION

- RESTRICTION NAME

| REACH ▼ |
| RoHS |
| ... |
| ALL |

- RESTRICTION CONTENT

| INFORMATION TRANSMISSION ▼ |
| ... |
| ALL |

IMPLEMENTATION

FIG.9

PRODUCT CHEMICAL SUBSTANCE CONTENT RATE

| PRODUCT ID | PRODUCT NAME | CHEMICAL SUBSTANCE ID | CONTENT RATE (%) |
|---|---|---|---|
| 100 | A-01 | CAS01 | 0.20 |
| 100 | A-01 | CAS02 | 0.06 |
| 100 | A-01 | CAS03 | 0.07 |
| 100 | A-01 | CAS04 | 0.15 |
| | | | |

FIG.10

| CHEMICAL SUBSTANCE ID | THRESHOLD VALUE JUDGMENT RESULT |
|---|---|
| CAS01 | EXCEEDED |
| CAS02 | ALLOWED |
| CAS03 | ALLOWED |
| CAS04 | EXCEEDED |

- EVALUATION SUBJECT PRODUCT: A-01
- EVALUATION SUBJECT RESTRICTION
  - RESTRICTION NAME: REACH
  - RESTRICTION CONTENT: INFORMATION TRANSMISSION
- ▼ DISPLAY DATA

FIG.11

JUDGMENT RESULT INFORMATION 115

| PRODUCT ID | PRODUCT NAME | CHEMICAL SUBSTANCE ID | RESTRICTION ID | THRESHOLD VALUE JUDGMENT RESULT FLAG | THRESHOLD VALUE EXCESS RATIO |
|---|---|---|---|---|---|
| 100 | A-01 | CAS01 | E-RE01 | 1 | 2 |
| 100 | A-01 | CAS02 | E-RE01 | 0 | 0.6 |
| 100 | A-01 | CAS03 | E-RE01 | 0 | 0.7 |
| 100 | A-01 | CAS04 | E-RE01 | 1 | 1.5 |
| ⋮ | | | | | |

FIG.12

■EVALUATION SUBJECT PRODUCT : A-01

■EVALUATION SUBJECT RESTRICTION

- RESTRICTION NAME : REACH
- RESTRICTION CONTENT : INFORMATION TRANSMISSION

▼ DISPLAY DATA

| CHEMICAL SUBSTANCE ID | THRESHOLD VALUE JUDGMENT RESULT | THRESHOLD VALUE EXCESS RATIO (TIMES) |
|---|---|---|
| CAS01 | EXCEEDED | 2 |
| CAS02 | ALLOWED | 0.6 |
| CAS03 | ALLOWED | 0.7 |
| CAS04 | EXCEEDED | 1.5 |
| ⋮ | | |

FIG.13

PRODUCT CHEMICAL SUBSTANCE CONTENT RATE

| PRODUCT ID | PRODUCT NAME | CHEMICAL SUBSTANCE ID | CONTENT RATE (%) | ESTIMATION METHOD |
|---|---|---|---|---|
| 100 | A-01 | CAS01 | 0.20 | MAXIMUM VALUE |
| 100 | A-01 | CAS01 | 0.15 | MEDIAN |
| 100 | A-01 | CAS01 | 0.12 | MINIMUM VALUE |
| 100 | A-01 | CAS02 | 0.06 | MAXIMUM VALUE |
| 100 | A-01 | CAS02 | 0.04 | MEDIAN |
| 100 | A-01 | CAS02 | 0.01 | MINIMUM VALUE |
| 100 | A-01 | CAS03 | 0.07 | MAXIMUM VALUE |
| 100 | A-01 | CAS03 | 0.05 | MEDIAN |
| 100 | A-01 | CAS03 | 0.03 | MINIMUM VALUE |
| 100 | A-01 | CAS04 | 0.15 | MAXIMUM VALUE |
| 100 | A-01 | CAS04 | 0.08 | MEDIAN |
| 100 | A-01 | CAS04 | 0.05 | MINIMUM VALUE |
| | ⋮ | | | |

FIG.16

PRODUCT CHEMICAL SUBSTANCE CONTENT RATE

| PRODUCT ID | PRODUCT NAME | CHEMICAL SUBSTANCE ID | CONTENT RATE (%) | CALCULATED ID |
|---|---|---|---|---|
| 100 | A-01 | CAS01 | 0.20 | 1 |
| 100 | A-01 | CAS01 | 0.15 | 2 |
| 100 | A-01 | CAS01 | 0.12 | 3 |
| 100 | A-01 | CAS02 | 0.06 | 2 |
| 100 | A-01 | CAS02 | 0.04 | 3 |
| 100 | A-01 | CAS02 | 0.01 | 1 |
| 100 | A-01 | CAS03 | 0.07 | 3 |
| 100 | A-01 | CAS03 | 0.05 | 1 |
| 100 | A-01 | CAS03 | 0.03 | 2 |
| 100 | A-01 | CAS04 | 0.15 | 1 |
| 100 | A-01 | CAS04 | 0.08 | 3 |
| 100 | A-01 | CAS04 | 0.05 | 2 |

FIG.17

JUDGMENT RESULT INFORMATION 115

| PRODUCT ID | PRODUCT NAME | CHEMICAL SUBSTANCE ID | CALCU-LATED ID | RESTRICTION ID | THRESHOLD VALUE JUDGMENT RESULT FLAG |
|---|---|---|---|---|---|
| 100 | A-01 | CAS01 | 1 | E-RE01 | 1 |
| 100 | A-01 | CAS01 | 2 | E-RE01 | 1 |
| 100 | A-01 | CAS01 | 3 | E-RE01 | 1 |
| 100 | A-01 | CAS02 | 2 | E-RE01 | 0 |
| 100 | A-01 | CAS02 | 3 | E-RE01 | 0 |
| 100 | A-01 | CAS02 | 1 | E-RE01 | 0 |
| 100 | A-01 | CAS03 | 3 | E-RE01 | 0 |
| 100 | A-01 | CAS03 | 1 | E-RE01 | 0 |
| 100 | A-01 | CAS03 | 2 | E-RE01 | 0 |
| 100 | A-01 | CAS04 | 1 | E-RE01 | 1 |
| 100 | A-01 | CAS04 | 3 | E-RE01 | 0 |
| 100 | A-01 | CAS04 | 2 | E-RE01 | 0 |

FIG.18

```
┌─────────────────────────────────────────────────┐ 102d
│  ■ EVALUATION SUBJECT  ┌──────────────────┐     │
│     PRODUCT:           │ A-01             │     │
│                        └──────────────────┘     │
│  ■ EVALUATION SUBJECT RESTRICTION               │
│   •RESTRICTION ┌────────┐   •RESTRICTION ┌──────────────┐
│    NAME:       │ REACH  │    CONTENT:    │ INFORMATION  │
│                └────────┘                │ TRANSMISSION │
│                                          └──────────────┘
│   ┌─────────────────────────────────────────┐   │
│   ▼ DISPLAY DATA                    106         │
│   ┌─────────────┬────────────────────────┐▼ │
│   │  CHEMICAL   │    THRESHOLD VALUE     │   │
│   │ SUBSTANCE ID│  EXCESS PROBABILITY (%)│   │
│   ├─────────────┼────────────────────────┤   │
│   │   CAS01     │          100           │   │
│   ├─────────────┼────────────────────────┤   │
│   │   CAS02     │           0            │   │
│   ├─────────────┼────────────────────────┤   │
│   │   CAS03     │           0            │   │
│   ├─────────────┼────────────────────────┤   │
│   │   CAS04     │          33            │   │
│   ├─────────────┼────────────────────────┤   │
│   │     ⋮       │                        │   │
│   └─────────────┴────────────────────────┘   │
└─────────────────────────────────────────────────┘
```

SYSTEM AND METHOD FOR SUPPORTING SELECTION OF SUBJECT FOR RESTRICTION COUNTERMEASURE

INCORPORATION BY REFERENCE

The present application claims priority from Japanese patent application JP2008-247082 filed on Sep. 26, 2008, the content of which is hereby incorporated by reference in this application.

TECHNICAL FIELD

The present invention relates to a method for supporting the selection of a subject for countermeasure for compliance with a restriction or the like to limit a chemical substance content rate (or content amount), in a method for managing the relevant chemical substance content rate (or content amount) of a product coming in or going out from each enterprise, and a system thereof.

BACKGROUND ART

Conventionally, in the method for managing the chemical substance content rate (or content amount) of a product coming in or going out from an enterprise, there have been methods described in the following Patent Literatures 1 and 2.

The former method is a method for summing up amounts of chemical substances contained in a product from amounts of chemical substances of each components composing the product, according to a component list of the product which an enterprise deals with, comparing them with threshold values specified by laws and regulations and the like, and judging whether the relevant product is in compliance with the restriction.

In addition, the latter method has disclosed a method for enhancing efficiency of inspection work of members, by evaluating, as for information on chemical substances contained in procured components which an enterprise acquired from a supplier or the like, correctness of the information of chemical substances contained in the relevant procured components provided by the third party, by utilizing chemical substance information which the relevant procured components and similar components have, and specifying the member to be analyzed preferentially using a measurement instrument, and a system thereof.

CITATION LIST

Patent Literatures

Patent Literature 1: JP-A-2005-71338
Patent Literature 2: JP-A-2007-79705

SUMMARY OF INVENTION

Technical Problem

In recent years, environmental restrictions have been strengthened in each country, and for example, in REACH (Registration Evaluation Authorization and Restriction of Chemicals) restriction established in Europe, when the content rate or total amount of import per year of the chemical substance contained in a product exceeds a certain specified ratio or amount, each enterprise in Europe is obliged to notify information on the relevant chemical substance to a user, or register it to an administration authority. Therefore, an exporter of the product is required to know the chemical substance content rates (or the content amounts) of the components composing the product and notify the chemical substance content rates (or the content amounts) of the relevant product to the customers. However, in the case where there are present many components whose content rates (or the content amounts) of the restriction subject substance are unknown, because of too many kinds of the relevant substances, there is a problem of tremendous man-hours to inspect the content rates (or the content amounts) of all restriction subject substances for all of these components.

By the way, the method described in the above Patent Literature 1 is a method for summing up the known chemical substance content rates (or the content amounts) of the components by accumulating them unit by unit of the product, and there is no consideration on a summation method in the case where there are present components having unknown content rate (or the content amount) of the restriction subject substance. In addition, the method described in the above Patent Literature 2 is a method for evaluating, as for the content rates (or content amounts) of the restriction subject substance contained in the components, correctness of components attribute information provided by the third party, by using statistic data of the chemical substance content rates (or content amounts) of the similar components, however, there is no consideration on a method for estimating the chemical substance content rates (or content amounts) of the product using the relevant components, judging a compliance situation to a restriction, and supporting the selection of the components for countermeasure.

Accordingly, it is an object of the present invention to provide a method for supporting the selection of a component or a chemical substance for countermeasure for compliance with the restriction or the like to limit a chemical substance content rate (or content amount), in a method for managing the relevant chemical substance content rate (or content amount) of a product coming in or going out from an enterprise, and a system thereof.

Solution to Problem

To achieve the above object, the present invention provides the following method for providing risk for the product chemical substance content rate (or the content amount) to exceed a restriction threshold value, on a method for supporting the selection of a component or a chemical substance for countermeasure for compliance with the restriction or the like to limit a chemical substance content rate (or content amount) of a product.

First of all, the present method accepts information on a product to be inspected on a compliance situation to a restriction, and information on evaluation subject restrictions, which are inputted by a user; acquires, from a memory device of the relevant computer, a threshold value of the chemical substance content rate or content amount of every restriction subject substance in the relevant restriction, information on composition components of the product in the relevant enterprise, weight of the relevant components, information on category of the relevant components, and the chemical substance content rate or content amount of the relevant components; extracts the components not having information on the relevant chemical substance content rate or content amount, among the relevant components; extracts similar components having the same category as the relevant components extracted; acquires the chemical substance content rate or content amount of the relevant similar components; allocates a statistic value such as the maximum value or average value of the chemical substance content rates or content amounts in the relevant similar components, as the chemical substance content rate or content amount of the relevant components extracted; calculates the chemical substance content rate or content amount of the relevant product, from information on composition components of the relevant product, weight of the relevant components, and the chemical substance content rate or content amount of the relevant components or the relevant similar components; compares the chemical substance content rate or content amount of the relevant product with the relevant threshold value; categorizes the chemical substances to one which exceeds the relevant threshold value and one which does not exceed the relevant threshold value, as comparison result; stores it in the relevant memory device; acquires the relevant comparison result from the relevant memory device; and displays it on the relevant display device.

Advantageous Effects of Invention

According to the present invention, countermeasure to the restriction or the like can be carried out efficiently, because chemical substances for countermeasure for compliance with the restriction or the like are outputted with priority ranking, in accordance with judgment result compared with a restriction threshold value.

Other objects, features and advantages of the present invention will become apparent from the following description of the Examples of the present invention relating to the accompanying drawings.

BRIEF DESCRIPTION OF DRAWINGS

FIG. 3 is a drawing showing one example of product-composing components information.

FIG. 4 is a drawing showing one example of components information.

FIG. 5 is a drawing showing one example of components chemical substance information.

FIG. 6 is a drawing showing one example of information on restriction threshold values.

FIG. 7 is a drawing showing one example of judgment result information.

FIG. 8 is a drawing showing one example of an input screen in an Example of the present invention.

FIG. 9 is a drawing showing one example of a product chemical substance content ratio in an Example of the present invention.

FIG. 10 is a drawing showing one example of a display screen showing "exceeded" and "approved" for restriction threshold values of every chemical substance ID in an Example of the present invention.

FIG. 11 is a drawing showing one example of judgment result information showing threshold value excess ratio of every chemical substance ID in an Example of the present invention.

FIG. 12 is a drawing showing one example of a display screen showing threshold value excess ratio of every chemical substance ID in an Example of the present invention.

FIG. 13 is a drawing showing one example of a product chemical substance content rate of every statistic value selected as an estimation method in an Example of the present invention.

FIG. 16 is a drawing showing one example of a product chemical substance content rate in another Example of the present invention.

FIG. 17 is a drawing showing one example of judgment result information in another Example of the present invention.

FIG. 18 is a drawing showing one example of a display screen showing threshold value excess probability of every chemical substance ID in another Example of the present invention.

DESCRIPTION OF EMBODIMENTS

Explanation will be given below on a method for achieving the present invention with reference to drawings.

Example 1

Figure 1:
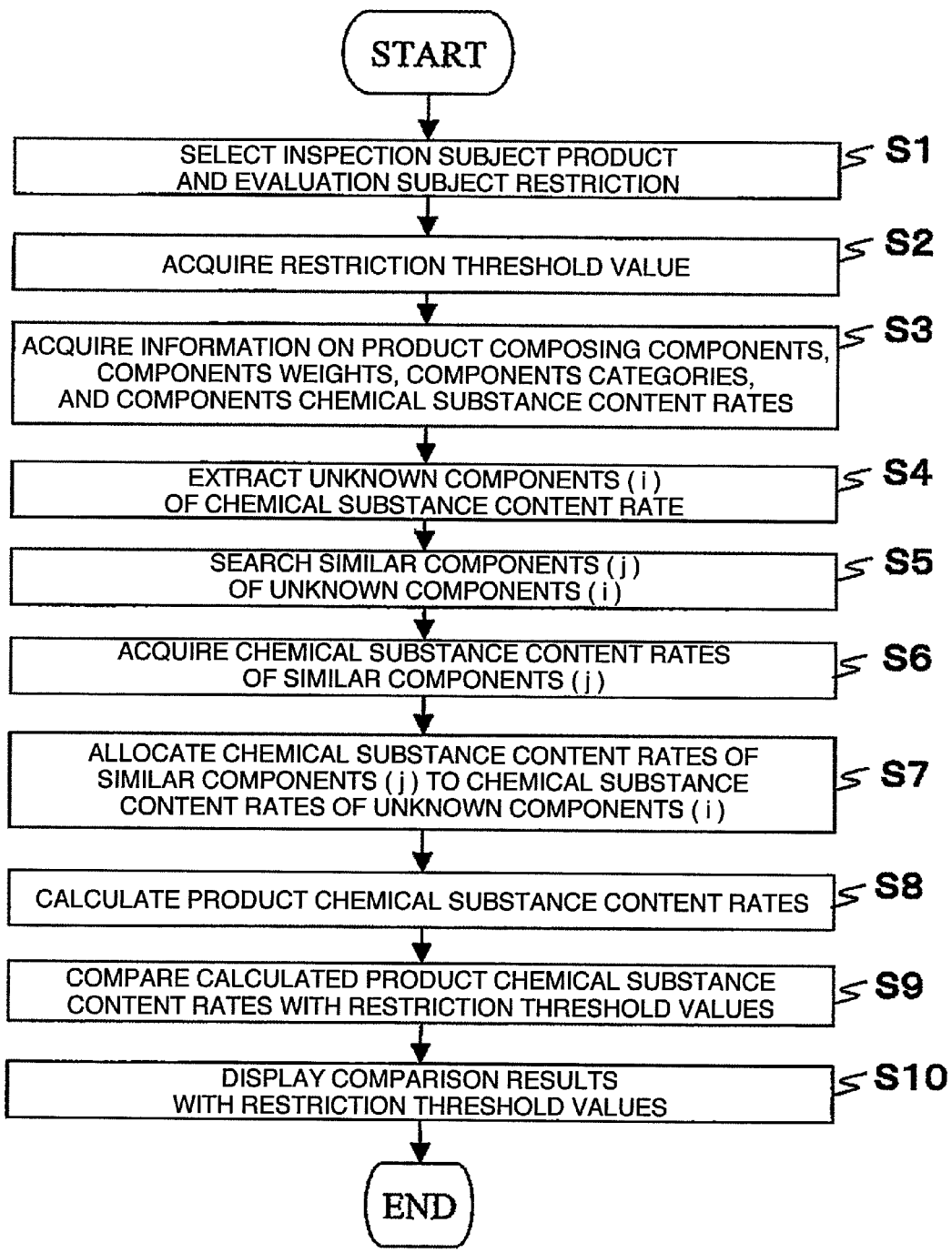
FIG. 1 is a drawing showing one example of a processing flow in an Example of the present invention.
Figure 2:
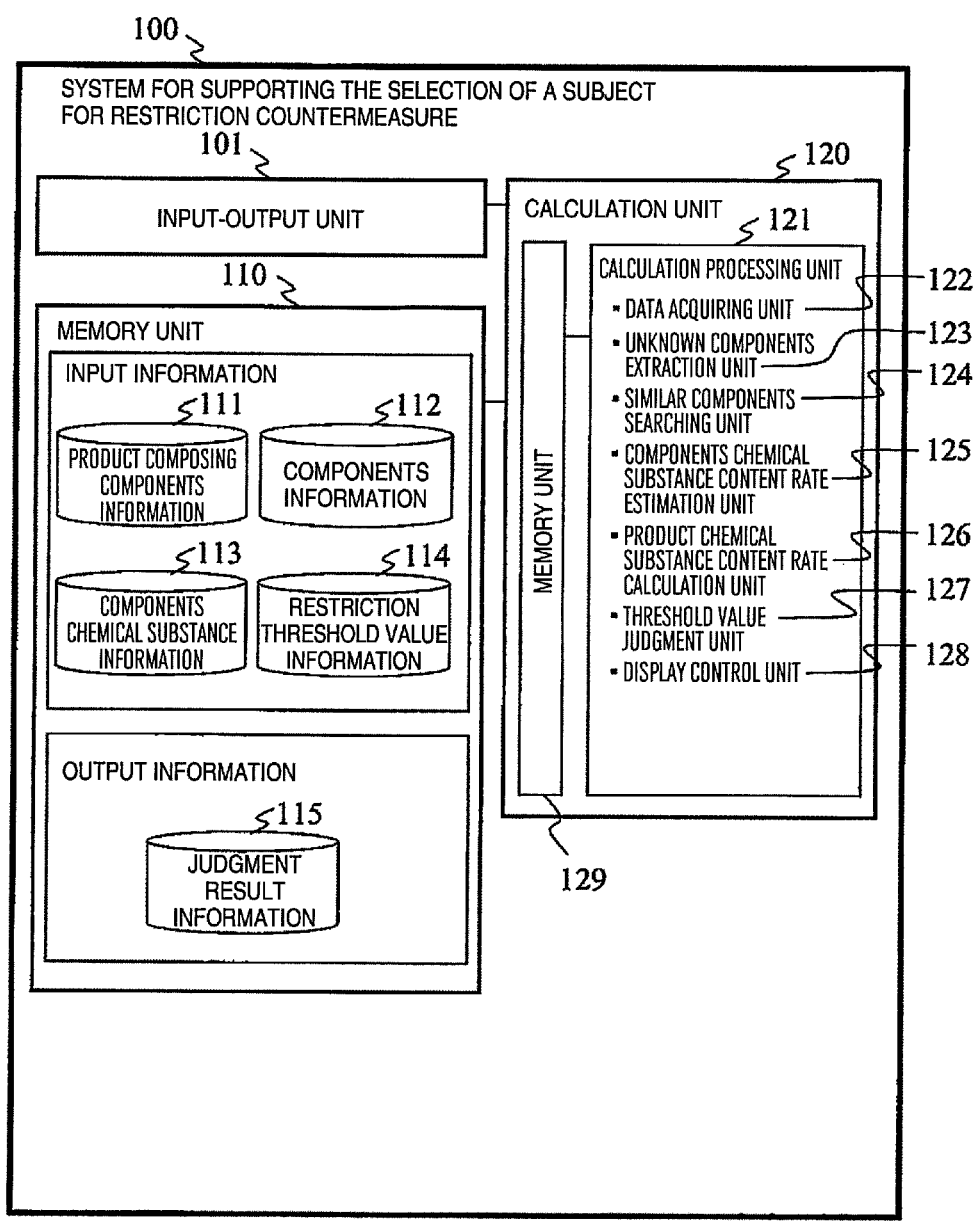
FIG. 2 is a block diagram showing a whole system composition relating to the present invention.

FIG. 1 is showing one example of a processing flow in the present Example, and FIG. 2 is a functional block diagram showing a system composition of the present Example.

In FIG. 2, a system 100 for supporting the selection of a subject for restriction countermeasure is a PC such as a server or a terminal which each enterprise has, and a system to be mounted to the relevant PC, and is provided with an input-output unit 101, a memory unit 110 and a calculation unit 120.

The input-output unit 101 is one for acquiring a data required in processing of the calculation unit 120, or for displaying processing results of the calculation unit 120, and is composed by having, for example, an input device such as a key board or a mouse, a communication device for communicating with the outside, an record playback device of a disk-type memory medium, an output device such as CRT or a liquid crystal monitor.

The memory unit 110 stores product composition components information 111, components information 112, components chemical substance information 113, restriction threshold value information 114, which are the input information to the calculation unit 120, and judgment result information 115, which is the output information from the calculation unit 120, and is composed of a memory device such as a hard disk drive or a memory.

The product composition components information 111 is information on components composing a product which each company deals with, and is composed of, for example, as shown in FIG. 3, a product ID, a product name, a component ID, a component name and a number. Here, the number shows number of components to be used in the product, and in the product composition components information 111 of FIG. 3, it is shown that, in a product name "A-01", "five pieces", "ten pieces", and "fifteen pieces" of components with a component name "a-01", "b-01", and "c-01" are used, respectively.

The components information 112 is information showing weight or category of each of the components in the product composition components information 111, and presence or absence of the components chemical substance information 113, and is composed of, for example, as shown in FIG. 4, a component ID, a component name, weight, a component category ID, a component category name, a chemical substance information flag. In the components information 112 of FIG. 4, the components having the chemical substance information flag of "1" shows that chemical substance information has already been inspected, and the components having the chemical substance information flag of "0" shows that chemical substance information has not yet been inspected.

The components chemical substance information 113 is information showing kind and chemical substance (or content rate) of a chemical substance contained in components procured from a supplier or the like, or produced by the own company, and is composed of, for example, as shown in FIG. 5, a component ID, a component name, a chemical substance ID and chemical substance. In the components chemical substance information 113 of FIG. 5, for example, the components having the components ID "p011" and the components name "a-01" shows to contain chemical substances of the chemical substance ID "CAS01" and "CAS03" in an amount of 0.070% and 0.040%, respectively.

The restriction threshold value information 114 shows a threshold value which each of subject laws and regulations or a content of the relevant laws and regulations has, and is composed of, for example, as shown in FIG. 6, a restriction ID, a restriction name, a restriction content, a threshold value, a unit and a condition. In the restriction threshold value information 114 of FIG. 6, in a restriction name "REACH" (Restriction Evaluation Authorization and Restriction of Chemicals), it is shown presence of two kinds of threshold values, that is the threshold value "0.1%" for the case of the restriction ID "E-RE01" and "1 t" for the case of the restriction ID "E-RE02", and is shown that "information transmission" or "notification" is required, when amount of a chemical substance is equal to or over this threshold value. As the condition, it is considered the case of "equivalent" (including the case of being within a predetermined error range) or "equal to or lower than", depending on the restriction, other than "equal to or more than" shown in FIG. 6 as an example. It should be noted that, "RoHS" stored in the restriction name of FIG. 6 is an abbreviation of Restriction of the use of Hazardous Substances.

The judgment result information 115 is information showing whether the content rate (or the content amount) of every product and every chemical substance exceeds the threshold value of the restriction threshold value information 114 or not, and is composed of, for example, as shown in FIG. 7, a product ID, a product name, a chemical substance ID, a restriction ID, and a threshold value judgment result flag. In the judgment result information 115 of FIG. 7, a chemical substance having the chemical substance ID "CAS01" contained in the product ID "100" and the product name "A-01", shows excess of the threshold value of the restriction ID "E-RE01" (the threshold value judgment result flag is "1").

In addition, the calculation unit 120 has a calculation processing unit 121 for practically carrying out a calculation processing, and a memory unit 129 as a work area of the calculation processing of this calculation processing unit 121.

The calculation processing unit 121 has a data acquiring unit 122 for acquiring a data from the input-output unit 101 or the memory unit 110, an unknown components extraction unit 123 for extracting unknown components on the chemical substance content rate of the components, a similar components searching unit 124 for searching other components having the same components category as the unknown components, a component chemical substance content rate estimation unit 125 for allocating any of the chemical substance content rates of the similar components searched above as the chemical substance content rate of the unknown components, a product chemical substance content rate calculation unit 126 for calculating the product chemical substance content rate, a threshold value judgment unit 127 for judging whether the product chemical substance content rate calculated above exceeds the restriction threshold value or not, and a display control unit 128 for displaying said judgment result on the display device of the input-output unit 101, and controlling the relevant display content.

Explanation will be given next on action of each function in the system for supporting the selection of a subject for restriction countermeasure 100 of FIG. 2, according to the processing flow of FIG. 1.

First of all, a user of the supporting system 100 inputs a name of a product to be evaluated whether it is in compliance with a restriction or not, with the input-output unit 101, and inputs a name and content of the evaluation subject restriction (S1). For example, the display device 102 of the input-output unit 101 displays such a screen as shown in FIG. 8 as an example, and the user inputs an evaluation subject product and selects the name and content of the evaluation subject restriction by a pull-down operation. The evaluation subject product or restriction subject and restriction content accepted by the input-output unit 101 are acquired by the data acquiring unit 122 of the calculation unit 120, which are stored temporarily in the memory unit 129. In addition, when a check mark is checked in a check box of all products, as for the evaluation subject products inputted from the screen shown in FIG. 8 as an example, evaluation is carried out whether they are in compliance with the restriction or not, as for the whole products registered in the product composition components information 111. Further, in the evaluation subject restriction inputted from a screen shown in FIG. 8 as an example, when "ALL" is inputted for the restriction name, evaluation is carried out on all restrictions registered in the restriction threshold value information 114, whereas, for example, when "ALL" is inputted for the restriction content with the restriction name of "REACH", evaluation is carried out on all restriction contents having the restriction name of "REACH", among restrictions registered in the restriction threshold value information 114. It should be noted that, in the screen example shown in FIG. 8, it is shown that a user inputted "A-01" as the evaluation subject product, selected the restriction name "REACH" as the evaluation subject restriction, and "information transmission" as the restriction content, and carried them out by pushing a carrying out button. Explanation will be given below on the case of the product "A-01", the restriction name "REACH" and the restriction content "information transmission".

Next, the data acquiring unit 122 acquires a restriction threshold value corresponding to the restriction name and the restriction content stored in the memory unit 129, from the restriction threshold value information 114 of the memory unit 110 (FIG. 6) (S2). Here, the restriction threshold value of "0.1%" is acquired in which the restriction name is "REACH" and the restriction content is "information transmission". Still more, the data acquiring unit 122 searches product names stored in the memory unit 129 from the product composition components information 111 (FIG. 3) stored in the memory unit 110, acquires the components name composing the relevant product, and number, acquires weight of the components having the relevant components name, components category and information relating to presence or absence of the chemical substance information, from the components information 112 (FIG. 4), and when the chemical substance information of the relevant components is present (the chemical substance information flag is "1"), acquires the chemical substance ID contained in the relevant components from the components chemical substance information 113 (FIG. 5) (S3). Here, the components "a-01", "b-01", and "c-01" of composing components of the product name "A-01", and numbers of each components "five pieces", "ten pieces", and "fifteen pieces", respectively, are acquired from the product composition components information 111 (FIG. 3), and as for these three components, the components weight "100 g", "80 g", "200 g", the components categories "A", "B", "C", and chemical substance information flags "1", "1", "0", respectively, are acquired from the components information 112 (FIG. 4), and still more, as for the components "a-01" and "b-01" having the chemical substance information flag of "1", the chemical substance ID and the content rate which these components have are acquired from the components chemical substance information 113 (FIG. 5). It should be noted that, a data acquisition method is shown using the product name or the components name, for explanation purpose in the present Example, however, processing may also be carried out using the product ID or the components ID relating to these product names.

Next, the unknown components extraction unit 123 extracts components not having the relevant chemical substance information (the chemical substance information flag is "0") (hereafter referred to as the unknown components) from information on presence or absence of the chemical substance information of the components acquired in S3 (S4). Here, the components "C-01" having the chemical substance information flag of "0" is extracted, in the components information 112 in S3 (FIG. 4).

And, the similar components searching unit 124 searches components having the same components category as the unknown components extracted in S4 (hereafter referred to as similar components) from the components information 112 (FIG. 4) (S5), and the components chemical substance content rate estimation unit 125 acquires the chemical substance content rate of the relevant similar components from the components chemical substance information 113 (FIG. 5) (S6). Here, the components "c-02", "c-03" and "c-04", having the same components category as the unknown components "c-01" extracted in S4 (the components category name is "C"), and having the chemical substance information flag of "1, are extracted from the components information 112 (FIG. 4), and the chemical substance IDs "CAS01", "CAS02", "CAS03" and "CAS04" which these components have and the content rate of each chemical substance ID are acquired from the components chemical substance information 113 (FIG. 5).

After that, the components chemical substance content rate estimation unit 125 allocates any of the chemical substance content rates of the relevant similar components acquired in S6, as the chemical substance content rate of the above unknown components and stores them in the memory unit 129 (S7). The chemical substance content rate to be allocated here shall be a statistic value such as the maximum value or average value in the chemical substance content rate of the similar components. Explanation will be given below on the case where the maximum value is allocated as the chemical substance content rates of the unknown components. Here, "0.280%", "0.072%", "0.082%" and "0.220%", which are the maximum values of content rates of chemical substance IDs "CAS01", "CAS02", "CAS03" and "CAS04" acquired in S6, respectively, are allocated as the chemical substance content rates of the unknown components "c-01" and stored in the memory unit 129.

Next, the product chemical substance content rate calculation unit 126 calculates the chemical substance content rates of the evaluation subject products stored in the memory unit 129, from the product composition components information, components weights, and components chemical substance content rates acquired in S3, and the chemical substance content rates of the similar components stored in the memory unit 129 in S7, and stores them in the memory unit 129 (S8). The content rate Ps of the chemical substance s in the evaluation subject product is calculated by the following expression.

[Expression 1]

$$P_s = \frac{\sum_{i=1}^{m} w_i \times p_{is} \times n_i}{\sum_{i=1}^{m} w_i \times n_i}$$

Expression 1

In the above expression, $w_i$, $p_{is}$ and $n_i$ represent weight of the components i composing the relevant evaluation subject product, the content rate of the chemical substance s, and number, respectively; m represents number of components composing the relevant evaluation subject product. In addition, a denominator in the above expression shows weight of the relevant evaluation subject product.

Here, for example, calculation of the evaluation subject product "A-01" stored in the memory unit 129, and of the content rate $P_{01}$ of the chemical substance ID "CAS01" is obtained as follows. In the Expression 1, when i=1, 2 and 3 correspond to composition components "a-01", "b-01" and "c-01" of the product "A-01", respectively, components weights, components chemical substance content rates and numbers are given as follows.

components weights: $w_1$=100 (g), $w_2$=80 (g), $w_3$=200 (g)
components chemical substance content rates: $p_{101}$=0.070 (%), $p_{201}$=0(%), $p_{301}$=0.280(%) ($p_{301}$ is the content rate of the chemical substance "CAS01" in the similar components "c-02" of the components "c-01".)
numbers: $n_1$=5 (piece), $n_2$=10 (piece), $n_3$=15 (piece)

Using these values, $P_{01}$ is calculated as follows from the Expression 1.

$P_{01}$=(100(g)×0.070(%)×5(piece)+80(g)×0(%)×10(piece)+200(g)×0.280(%)×15(piece)/(100(g)×5(piece)+80(g)×10(piece)+200(g)×15(piece))≈0.20(%)

Similarly, calculation of the content rates $P_{02}$, $P_{03}$ and $P_{04}$ of the chemical substance IDs "CAS02", "CAS03" and "CAS04" gives $P_{02}$≈0.06(%), $P_{03}$≈0.07(%), $P_{04}$≈0.15(%), and as shown in FIG. 9, the chemical substance content rate of the product "A-01" is calculated.

And, the threshold value judgment unit 127 compares the product chemical substance content rates stored in the memory unit 129 with the restriction threshold values acquired in S2, and outputs the judgment result information 115 to the memory unit 110 (S9). Here, when the product chemical substance content rate shown in FIG. 9 are compared with "0.1%", which is the threshold value of the restriction name "REACH", the restriction content "information transmission" stored in the memory unit 129 in S2, "0.20%" and "0.15%", which are the content rates of the chemical substance IDs "CAS01" and "CAS04", exceed the threshold value, therefore, in the judgment result information 115 shown in FIG. 7, "1" is given and outputted as the threshold value judgment result flag of these chemical substance IDs, whereas "0" is given and outputted as the threshold value judgment result flag as for "CAS02" and "CAS03" which do not exceed the threshold value.

Lastly, the display control unit 128 reads the judgment result information 115 and displays it on the display device of the input-output unit 101 (S10). Here, when the judgment result information 115 shown in FIG. 7 is read, for example, such a screen as shown in FIG. 10 is displayed on a display device 102*a* of the input-output unit 101. On the screen of the display device 102*a* shown in FIG. 10, the evaluation subject product and the evaluation subject restriction inputted by a user in S1 are displayed, and in a display data column, ID of the chemical substance contained in the product "A-01", and threshold value judgment result are shown. Here, those having "1" and "0" as the threshold value judgment result flag are displayed as "exceeded" and "allowed", respectively. In addition, in the display device 102*a* of FIG. 10, when a user clicks a threshold value judgment result re-alignment button 103, chemical substance IDs having "exceeded" for the threshold value judgment result in the display data column can be aligned in the order from the top, and thus a restriction countermeasure work can be started preferentially from these chemical substances. As the restriction countermeasure work, there are included to prepare documents for information transmission to a user, for example, on the chemical substances having "exceeded" for the threshold value judgment result, or to study replacement of the relevant components by searching components containing the relevant chemical substance, or to carry out inspection on the components chemical substance content rate to a supplier for the unknown components containing the relevant chemical substance in the similar components.

In the present Example, even in the case where the chemical substance content rates are unknown in a component of the components composing the product, the restriction countermeasure work can be started preferentially for ones having "exceeded" threshold value, by utilizing the chemical substance content rate in the similar components of the relevant components, estimating the product chemical substance content rate, and judging whether the content rate of the relevant product chemical substance exceeds the restriction threshold value or not, therefore it is possible to carry out the relevant work efficiently.

In addition, in the present Example, the threshold value judgment unit 127 outputted the threshold value judgment result flag showing whether the relevant threshold value is exceeded or not to every chemical substance ID, for the product chemical substance content rate which exceeded the restriction threshold value (S9), in outputting the judgment result information 115 to the memory unit 110, however, still more, as shown in FIG. 11, by outputting the threshold value excess ratio which is ratio of the relevant threshold value and the chemical substance content rate of the comparison subject, the display control unit 128 may display the relevant threshold value excess ratio on the display device of the input-output unit 101 (S10). Here, when the judgment result information 115 shown in FIG. 11 was read in, for example, such a screen as shown in FIG. 12 is displayed on a display device 102*b* of the input-output unit 101. In the screen of the display device 102*b* shown in FIG. 12, the threshold value excess ratio is displayed, and when a user clicks a threshold value excess ratio re-alignment button 104, the chemical substance IDs can be re-allocated in the order of the higher threshold value excess ratio in the display data column. In this way, the restriction countermeasure work can be started preferentially from one having the higher threshold value excess ratio, among the chemical substances having "exceeded" in the threshold value judgment result, which enables to carry out the relevant work still more efficiently.

Figure 14:
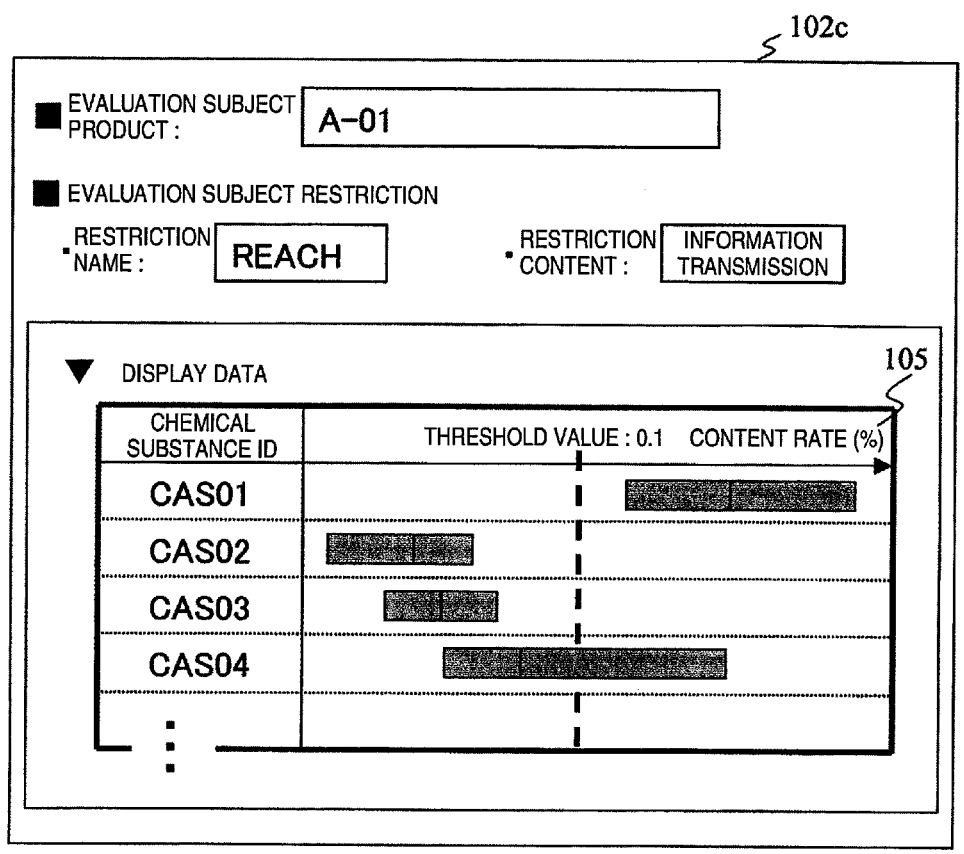
FIG. 14 is a drawing showing one example of a display screen showing comparison result of a product chemical substance content rate and a restriction threshold value of every statistic value selected as an estimation method in an Example of the present invention.

Still more, in the present Example, when the components chemical substance content rate estimation unit 125 estimates the chemical substance content rate of the unknown components, only the maximum value of the content amount of the chemical substance having the same components category as the relevant unknown components was allocated (S7), however, a plurality of statistic values such as the maximum value, median, minimum value and the like may be allocated and the product chemical substance content rate may be calculated for each estimation method. For example, in the case where the median of the chemical substance content rates of the similar components "c-02", "c-03" and "c-04" of the relevant components are allocated, as the chemical substance content rate of the components "c-01", in the components chemical substance information 113 shown in FIG. 5, "0.200%", "0.043%", "0.053%" and "0.110%", which are the medians of "CAS01", "CAS02", "CAS03" and "CAS04", respectively, are allocated as the chemical substance content rates of the unknown components "c-01". In this way, by estimating the chemical substance content rate of the unknown components and calculating the product chemical substance content rate (S8), such values as shown, for example, in FIG. 13 are obtained. In FIG. 13, an estimation method column is information showing which statistic value was used, in allocating the chemical substance content rate of the unknown components. Still more, by comparing the product chemical substance content rate shown in FIG. 13 with "0.1%", which is the threshold value of the restriction name "REACH", the restriction content "information transmission" in the restriction threshold value information 114 of FIG. 6, (S9), the display control unit 128 displays them on the display device of the input-output unit 101 (S10). For example, in a display device 102*c* of the input-output unit 101, such a screen as shown in FIG. 14 is displayed. In FIG. 14, in a display data column, a range of the content rates of every chemical substance contained in the evaluation subject product "A-01", and the threshold values of the evaluation subject restrictions are displayed, and for example, in a content rate column 105, the minimum value, median and maximum value of every chemical substance are displayed using a bar graph. By this, a user may put priority ranking of the restriction countermeasure work, depending on whether any of the minimum value, median and maximum value exceeded the threshold value or did not exceed the threshold value.

Example 2

As another Example of the present invention, a method will be shown for carrying out processing predetermined number of times, from randomly allocating the chemical substance content rates of the similar components as the chemical substance content rates of the unknown components, to calculating the product chemical substance content rate.

Figure 15:
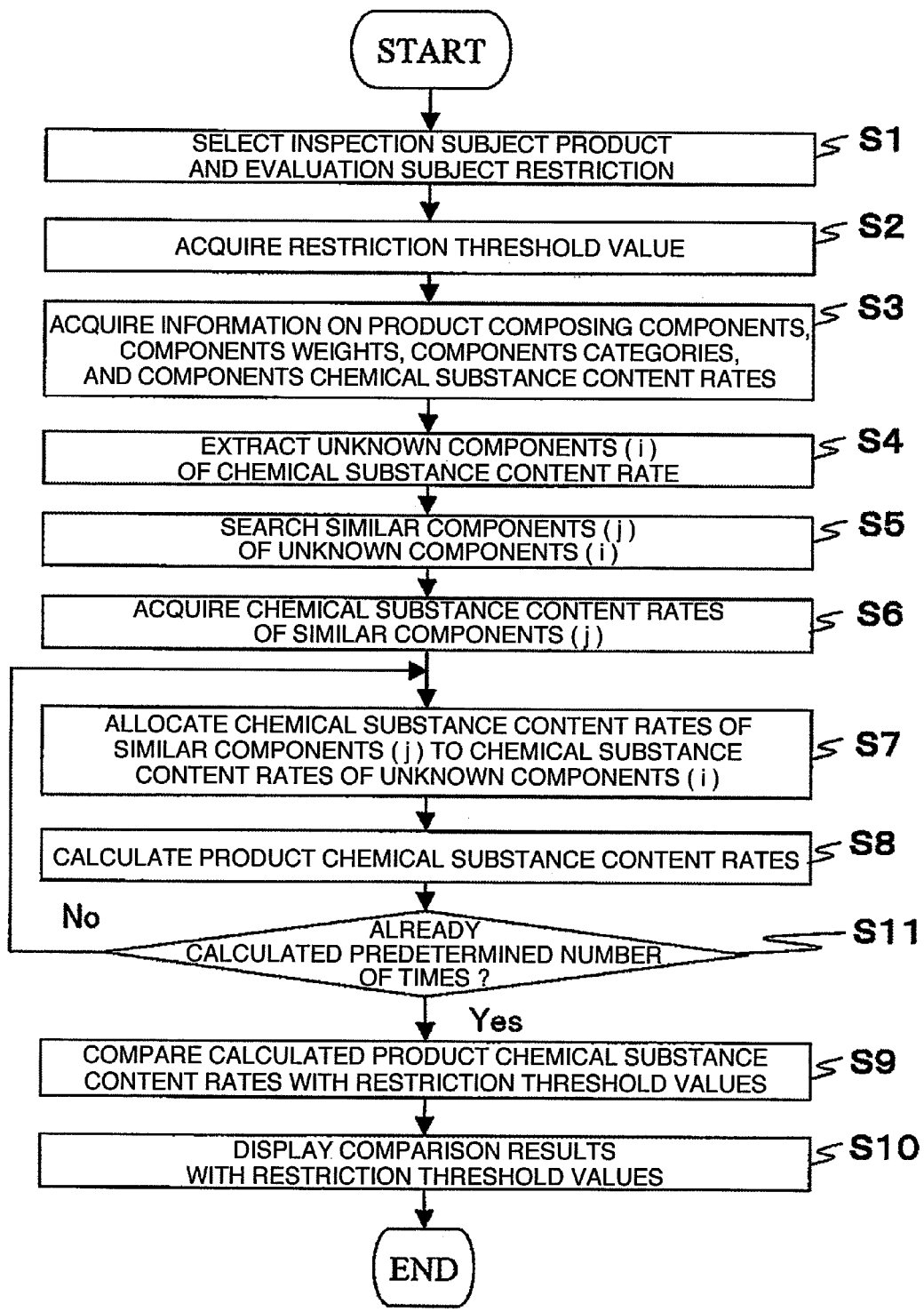
FIG. 15 is a drawing showing one example of a processing flow in another Example of the present invention.

A system composition of the present Example may be the same as shown in FIG. 2, and as for a processing flow, one shown in FIG. 15 is used.

Explanation will be given now on action of each function in the system for supporting the selection of a subject for restriction countermeasure 100 of FIG. 2, according to the processing flow of FIG. 15.

First of all, a user of the supporting system 100 inputs a name of a product to be evaluated whether it is in compliance with a restriction or not, with the input-output unit 101, and inputs a name and content of the evaluation subject restriction (S1). Here, as shown in FIG. 8, explanation will be given on the case where a user inputs "A-01" as the evaluation subject product, selects the restriction name "REACH", the restriction content "information transmission" as the evaluation subject restriction, and carries out them.

Next, the data acquiring unit 122 acquires a restriction threshold value corresponding to the restriction name and the restriction content stored in the memory unit 129, from the restriction threshold value information 114 of the memory unit 110 (FIG. 6) (S2). Here, the restriction threshold value of "0.1%" is acquired in which the restriction name is "REACH" and the restriction content is "information transmission". Still more, the data acquiring unit 122 searches the product composition components information 111 (FIG. 3) stored in the memory unit 110 from product names stored in the memory unit 129, acquires the components name composing the relevant product and number, acquires weight of the components having the relevant components name, components category and information relating to presence or absence of the chemical substance information, from the components information 112 (FIG. 4), and when the chemical substance information of the relevant components is present (the chemical substance information flag is "1"), acquires the chemical substance ID contained in the relevant components from the components chemical substance information 113 (FIG. 5) (S3). Here, the components "a-01", "b-01", and "c-01" of composing components of the product name "A-01", and numbers of each components "five pieces", "ten pieces", and "fifteen pieces", respectively, are acquired from the product composition components information 111 (FIG. 3), and as for these three components, the components weight "100 g", "80 g", "200 g", the components categories "A", "B", "C", and chemical substance information flags "1", "1", "0", respectively, are acquired from the components information 112 (FIG. 4), and still more, as for the components "a-01" and "b-01" having the chemical substance information flag of "1", the chemical substance ID and the content rate which these components have are acquired from the components chemical substance information 113 (FIG. 5).

Next, the unknown components extraction unit 123 extracts components not having the relevant chemical substance information (the chemical substance information flag is "0") (hereafter referred to as the unknown components) from information on presence or absence of the chemical substance information of the above components acquired in S3 (S4). Here, the components "C-01" having the chemical substance information flag of "0" is extracted, in the components information 112 in S3 (FIG. 4).

And, the similar components searching unit 124 searches components having the same components category as the components extracted in S4 (hereafter referred to as similar components) from the components information 112 (FIG. 4) (S5), and the components chemical substance content rate estimation unit 125 acquires the chemical substance content rate of the relevant similar components from the components chemical substance information 113 (FIG. 5) (S6). Here, the components "c-02", "c-03" and "c-04", having the same components category as the unknown components "c-01" extracted in S4 (the components category name is "C"), are extracted from the components information 112 (FIG. 4), and the chemical substance IDs "CAS01", "CAS02", "CAS03" and "CAS04" which these components have and the content rate of each chemical substance ID are acquired from the components chemical substance information 113 (FIG. 5).

After that, the components chemical substance content rate estimation unit 125 allocates all of the chemical substances which any of the similar components contain, from the chemical substance content rates of the relevant similar components acquired in S6, as the chemical substance content rate of the unknown components and stores them in the memory unit 129 (S7). The chemical substance content rate to be allocated here may be acquired by a method for extracting any of the similar components searched in S5, in accordance with equivalent probability or purchasing ratio of the relevant similar components, and adopting it as the chemical substance content rate of the similar components extracted. Here, the chemical substance content rate of the components "c-02" is assumed to be allocated from the components chemical substance information 113 shown in FIG. 5.

Next, the product chemical substance content rate calculation unit 126 calculates the chemical substance content rates of the evaluation subject products stored in the memory unit 129, from the product composition components information, components weights, and components chemical substance content rates acquired in S3, and the chemical substance content rates of the above similar components stored in the memory unit 129 in S7, and stores them in the memory unit 129 (S8). The content rate Ps (n) of the chemical substance s in the evaluation subject product is calculated by Expression 1, similarly as in Example 1. However, n represents calculation number of times from S7 to S8. In this case, calculation of the content rates, $P_{01}$ (1), $P_{02}$ (1), $P_{03}$ (1) and $P_{04}$ (1) of the chemical substance IDs "CAS01", "CAS02", "CAS03" and "CAS04" in the evaluation subject product [A-01], gives $P_{01}$ (1)≠0.20(%), $P_{02}$ (1)=0.01(%), $P_{03}$ (1)≈0.05(%) and $P_{04}$ (1)≈0.15(%).

And, judgment is carried out whether calculation from S7 to S8 has already been carried out predetermined number of times or not (S11), and when the calculation has not yet been carried out predetermined number of times, calculation from S7 to S8 is carried out again, and when the calculation has already been carried out predetermined number of times, the step proceeds to S9. Here, the predetermined number of times may be memorized in the system in advance, or a user may input it from the display device in the input-output unit 101. In the present Example, hereafter, this predetermined number of times is set at three times. At the present stage, because calculation has been carried out only one time, the process returns to S7 again. Similarly hereinafter, provided that the chemical substance content rates of the components "c-03" and "c-04" are each allocated from the components chemical substance information 113 shown in FIG. 5, by the processing in S7 in the second and the third times, calculation of the content rates, $P_{01}$ (2), $P_{02}$ (2), $P_{03}$ (2), $P_{04}$ (2) and $P_{01}$ (3), $P_{02}$ (3), $P_{03}$ (3), $P_{04}$ (3) of the chemical substance IDs, "CAS01", "CAS02", "CAS03" and "CAS04" of the evaluation subject product [A-01] in the second and the third times, gives $P_{01}$ (2)≈0.15(%), $P_{02}$ (2)≈0.06(%), $P_{03}$ (2)≈0.03(%), $P_{04}$(2)≈0.05 (%), $P_{01}$ (3)≈0.12(%), $P_{02}$ (3)≈0.04(%), $P_{03}$(3)≈0.07(%) and $P_{04}$(3)≈0.08(%), and thus, as shown in FIG. 16, the chemical substance content rates of the product [A-01] are calculated. The calculated ID of FIG. 16 shows which number of times of calculation result it is, among the predetermined number of times.

And, the threshold value judgment unit 127 compares the product chemical substance content rates stored in the memory unit 129 with the restriction threshold values acquired in S2, and outputs the judgment result information 115 to the memory unit 110 (S9). Here, the product chemical substance content rate shown in FIG. 16, and "0.1%", which is the threshold value of the restriction name "REACH", the restriction content "information transmission" stored in the memory unit 129 in S2, are compared, and the judgment result information 115 shown in FIG. 17 is outputted.

Lastly, the display control unit 128 reads the judgment result information 115 and displays it on the display device of the input-output unit 101 (S10). Here, when the judgment result information 115 shown in FIG. 17 is read in, for example, such a screen as shown in FIG. 18 is displayed on a display device 102*d* of the input-output unit 101. In the screen of the display device 102*d* shown in FIG. 18, the evaluation subject product and the evaluation subject restriction inputted by a user in S1 are displayed, and in a display data column, ID of the chemical substance contained in the product "A-01", and threshold value excess probability are shown. The threshold value excess probability is one showing how many times the product chemical substance content rate exceeded the restriction threshold value, among repeated number of times of calculation from S7 to S8 of every chemical substance ID, and for example, because the chemical substance ID "CAS01" in FIG. 17 exceeds the restriction threshold value all three times, the threshold value excess probability is displayed as "100%" in the display device 102*d* shown in FIG. 18. In addition, when a user clicks a threshold value excess probability re-alignment button 106, chemical substance IDs can be aligned in the order of the larger threshold value excess probability in the display data column, and thus a restriction countermeasure work can be started preferentially from these chemical substances.

According to the present Example, in the case of estimating the chemical substance content rate in the unknown components, because of carrying out simulation in multiple number of times by allocating the chemical substance content rate of the relevant similar components itself, instead of a statistic value of the chemical substance content rate in the similar components of the relevant components, it is possible to estimate the product chemical substance content rate in a situation that distribution of the chemical substance content rates of the similar components is reflected more, and by increasing this simulation number of times, it is possible to carry out the estimation with high accuracy.

It is clear to those skilled in the art that, although the above description has been made on Examples, the present invention is not limited thereto and various changes and modifications may be made within a range of the spirit of the present invention and the scope of the appended claims.

| Reference Signs List | |
|---|---|
| 100 | System for supporting the selection of a subject for restriction countermeasure |
| 101 | Input-output unit |
| 102 | Display device |
| 103 | Threshold value judgment result re-alignment button |
| 104 | Threshold value excess ratio re-alignment button |
| 105 | Content rate column |
| 106 | Threshold value excess probability re-alignment button |
| 110 | Memory unit, |
| 111 | Product composing components information |
| 112 | Components information |
| 113 | Components chemical substance information |
| 114 | Restriction threshold value information |
| 115 | Judgment result information |
| 120 | Calculation unit |
| 121 | Calculation processing unit |
| 122 | Data acquiring unit |
| 123 | Unknown components extraction unit |
| 124 | Similar components searching unit |
| 125 | Components chemical substance content rate estimation unit |
| 126 | Product chemical substance content rate calculation unit |
| 127 | Threshold value judgment unit |
| 128 | Display control unit |
| 129 | Memory unit |

The invention claimed is:

1. A system for supporting the selection of a subject for restriction countermeasure wherein an enterprise selects a subject for countermeasure for compliance with a restriction to limit a content rate or content amount of a chemical substance of a product coming in or going out from the enterprise, the system comprising:
a memory unit configured to memorize, by composing a first database having data of at least a product ID of the product, a component ID composing the product, and number of the components, a second database having data of at least a component ID of the components, weight, a component category ID, and a flag indicating presence or absence of chemical substance information, a third database having data of at least a component ID, a chemical substance ID which the components contain, and a content rate of the chemical substance contained in the components, and a fourth database having data of at least a restriction name, restriction contents, threshold values, and units;
an input-output unit; and
a calculation unit;
wherein said input-output unit is configured to accept from a user, information on a subject product which is subjected to inspection of a compliance situation to said restriction, and information on evaluation subject restrictions,
wherein said calculation unit is configured to effect operations of:
searching the components composing said subject product from said first database, and extracting from them the components whose information on chemical substances contained is unknown, according to the flag showing presence or absence of the chemical substance information of said second database;
extracting similar components having the same components category ID as the components category ID of said unknown components extracted, and represented as having the chemical substance information by the flag showing presence or absence of chemical substance information, by searching said second database;
reading out the chemical substance content rate of said similar components from said third database, and allocating a statistic value of the content rate to every chemical substance, as the chemical substance content rate of said unknown components;
calculating the content rate of a product chemical substance of said subject product, according to the content rate of the chemical substance of said unknown components allocated, and the chemical substance content rates of the whole components composing another product other than said unknown components read out from the third database; and
comparing said calculated product chemical substance content rate with the threshold value for said evaluation subject restriction read out from the fourth database, and outputting the comparison result on whether the product chemical substance content rate of each chemical substance is exceeded, equivalent or lower than said threshold value on the display device of said input-output unit.

2. The system for supporting the selection of a subject for restriction countermeasure according to claim 1, in the outputting said comparison results on the display device of said input-output unit carried out by said calculation unit, said comparison result is categorized to a chemical substance which exceeds said threshold value and a chemical substance which does not exceed the threshold value and displayed in said display device, in accordance with an input of a user.

3. The system for supporting the selection of a subject for restriction countermeasure according to claim 1 or 2, wherein in the outputting said comparison result on the display device of said input-output unit, which said calculation unit carries out, a ratio of the chemical substance content rate or the content amount of said subject product and said threshold value is calculated; the relevant ratio is displayed on said display device; and the content rate or the content amount for every chemical substance in the relevant product is re-aligned in the order of largeness or smallness of the relevant ratio and displayed, in accordance with an input of a user.

4. The system for supporting the selection of a subject for restriction countermeasure according to claim 1, wherein in the reading out the chemical substance content rate of said similar components from said third database, and allocating the statistic value of the content rate to every chemical substance as the content rate of said unknown components, which said calculation unit carries out, a statistic value of the content rate of each chemical substance adopts a maximum value, a median or a minimum value of the content rates for every chemical substance by targeting at the chemical substance content rates which the whole similar components have.

5. The system for supporting the selection of a subject for restriction countermeasure according to claim 1, wherein, instead of the reading out the chemical substance content rate of said similar components from said third database, and allocating a statistic value of the content rate to every chemical substance as the chemical substance content rate of said unknown components carried out by said calculation unit, said calculation unit is configured to carry out operations of selecting similar components (j), reading out chemical substance content rate of the similar components (j) from said third database, and allocating the chemical substance content rate of said similar components (j) as the chemical substance content rate of said unknown components;

said calculation unit is configured to judge whether the product chemical substance content rate was calculated predetermined number of times or not, after said calculation unit carries out calculating the product chemical substance content rate of said subject product;

when predetermined number of times of calculations have not yet completed, said calculation unit is configured to again carry out operations of selecting new j different from said similar components (j) selected, reading out the chemical substance content rate of the new similar components (j) from said third database, and allocating the chemical substance content rate of said new similar components (j) as the chemical substance content rate of said unknown components; and when predetermined number of times of calculations have already completed, said calculation unit is configured to carry out an operation of comparing the product chemical substance content rate calculated in every calculation time with said restriction threshold value for every chemical substance.

6. The system for supporting the selection of a subject for restriction countermeasure according to claim 5, wherein said calculation unit is configured to carry out a further operation of outputting probability for the product chemical substance content rate of each chemical substance to exceed said restriction threshold value, on the display device of said input-output unit.

7. The system for supporting the selection of a subject for restriction countermeasure according to claim 6, wherein said calculation unit is configured to carry out operations of aligning a data of each chemical substance in the order of larger probability for the product chemical substance content rate of each chemical substance to exceed said restriction threshold value, and outputting said data of each chemical substance aligned on the display device of said input-output unit.

8. The system for supporting the selection of a subject for restriction countermeasure according to claim 1, wherein a database is composed by recording a content amount of the chemical substance contained in the components, instead of the content rate recorded in said third database, wherein said calculation unit is configured to read out the chemical substance content amount of the components, instead of the chemical substance content rate of the components from said third database, allocate it as the chemical substance content amount of said unknown components, and calculate the product chemical substance content amount.

* * * * *